United States Patent [19]

Sayre

[11] Patent Number: 5,175,808
[45] Date of Patent: Dec. 29, 1992

[54] METHOD AND APPARATUS FOR NON-AFFINE IMAGE WARPING

[75] Inventor: Rick Sayre, San Francisco, Calif.

[73] Assignee: Pixar, San Rafael, Calif.

[21] Appl. No.: 406,227

[22] Filed: Sep. 12, 1989

[51] Int. Cl.$^5$ .............................. G06F 15/66
[52] U.S. Cl. .......................... 395/133; 395/136; 395/125; 382/44
[58] Field of Search ............ 382/44, 45, 46, 47; 358/22, 445, 451; 340/731, 728; 364/518, 522; 395/133, 136-139, 125

[56] References Cited

U.S. PATENT DOCUMENTS

| | | | |
|---|---|---|---|
| 4,468,688 | 8/1984 | Gabriel et al. | 358/22 |
| 4,672,464 | 6/1987 | Shida | 358/451 |
| 4,805,117 | 2/1989 | Fiore et al. | 364/518 |
| 4,885,786 | 12/1989 | Anderson et al. | 382/47 |
| 4,908,874 | 3/1990 | Gabriel | 382/46 X |
| 4,985,849 | 1/1991 | Hideaki | 364/518 |

OTHER PUBLICATIONS

Foley et al., *Fundamentals of Interactive Computer Graphics*, Addison-Wesley, 1982, pp. 245-255.
Catmull & Smith, "3-D Transformations of Images in Scanline Order" Computer Graphics, (Siggraph '80 Proceedings) vol. 14, No. 3, pp. 279-285, Jul. 1980.
Catmull & Rom, "A Class of Local Interpolating Splines" Computer Aided Geometric Design, R. E. Barnhill & R. F. Riesenfeld, eds., Academic Press, New York, 1974, pp. 317-326.

*Primary Examiner*—Gary V. Harkcom
*Assistant Examiner*—Raymond J. Bayerl
*Attorney, Agent, or Firm*—Hecker & Harriman

[57] ABSTRACT

A method and apparatus for two-pass image transformation, providing a general solution to execute arbitrary warping of an image. A bicubic mesh is created, by splines or other suitable means, and is used to create displacement tables for X and Y displacement. Alternatively, the displacement tables can be generated directly. The displacement tables represent the movement of each pixel from an original location in the source image to a new location in the destination image. One of the displacement maps is applied to the source image to create an intermediate image and to the other displacement map to create a resampled displacement map. The resampled map is then applied to the intermediate image to create the destination image. By resampling, compensation for altered location points is done automatically. In this manner, no inversion of the underlying equations and functions is required.

5 Claims, 5 Drawing Sheets

SOURCE IMAGE

| y\x | 0 | 1 | 2 |
|---|---|---|---|
| 0 | a | b | c |
| 1 | d | e | f |
| 2 | g | h | i |

FIG. 5B

TEMPORARY IMAGE

| y\x | 0 | 1 | 2 | 3 | 4 |
|---|---|---|---|---|---|
| 0 | a | 1 | ²b | → | 4 |
| 1 | d | 1 | ²e | → | 4 |
| 2 | g | 1 | ²h | → | 4 |

FIG. 5C

DESTINATION IMAGE

| y\x | 0 | 1 | 2 | 3 | 4 |
|---|---|---|---|---|---|
| 0 | a |   | b |   | c |
| 1 | 1 |   | 1 |   | 1 |
| 2 | d' |   | e' |   | f' |
| 3 |   |   |   |   |   |
| 4 | g' |   | h' |   | i' |

FIG. 5D $$X' = 2X + \emptyset Y + \emptyset$$
$$Y' = \emptyset X + 2Y + \emptyset$$

$$\begin{bmatrix} A & D \\ B & E \\ C & F \end{bmatrix} = \begin{bmatrix} 2 & \emptyset \\ \emptyset & 2 \\ \emptyset & \emptyset \end{bmatrix}$$

METHOD AND APPARATUS FOR NON-AFFINE IMAGE WARPING

BACKGROUND OF THE PRESENT INVENTION

1. FIELD OF THE INVENTION

This invention relates to the field of image processing and image transformation.

2. BACKGROUND ART

In computer graphics applications, source images are created and manipulated by a user to achieve a variety of effects. A user may, among other operations, rotate, invert, animate, distort, resize, color or combine images. A computer graphics or imaging system provides a tool to accomplish these operations. One method of distorting an image is known as "warping."

The term warping is often used in image processing and computer graphics to mean a two-dimensional "resampling" of an image. In general, warping is a mapping of a two-dimensional planar region onto a two-dimensional surface. In certain computer graphic applications, an image may be mapped onto a two-dimensional projection of a three-dimensional surface or portion of a surface.

In many applications, distortions, abberations, or other flaws are introduced by sensors that are used to obtain data to generate a source image. These sensors can be any means for capturing or creating a source image, such as, for example, lenses, magnetic resonant imaging, cat scans, and digitized scans of existing images. It is highly desirable to be able to remove imperfections introduced by the sensors from the source image. Filtering is not always able to remove certain types of flaws. Thus, image warping is used.

In other instances, it may be desired to introduce distortions to an image for artistic or other reasons. In addition, by creating sequences of deformed images, each one slightly different than the one before, animated sequences can be produced by using warping.

An image warp, whether to remove or introduce distortion to a source image, is created and applied to the source image. The image warp may be a purely mathematical expression of varying degrees of complexity; (sphere, ellipsoid, etc). The image warp may also be a three-dimensional texture representation.

In image processing, warping functions are typically characterized or referred to by order of the warping function, i.e., an "nth order warp." For example, a "first order warp" is a linear function, an example of which is a "resize." A second order warp is a quadratic function, such as a "pin cushion" effect or "barrel" effect. A third order warp is described by a cubic polynomial function.

Warping functions can be wholly arbitrary functions. Thus, warping functions are not limited to closed-form mathematical descriptions (such as a hemisphere or other simple form), or to symmetrical forms. For example, a warping function can be described by a flexible surface which is pressed or stretched at many locations to form an arbitrary three-dimensional surface. This arbitrary surface is then applied to an existing image which is distorted to conform to the irregularities in a two dimensional projection of the arbitrary surface.

PRIOR ART WARPING TECHNIQUES

One prior art method of executing a warping operation is known as a "two pass transform" and is described in Catmull and Smith's "3-D Transformation of Images in Scanline Order," Computer Graphics (Siggraph '80 proceedings) Vol. 14, No. 3, pp. 279-285, July 1980, and incorporated herein by reference. The two pass transform of this reference spatially transforms 2-D images by decomposing the mapping of the image into a sequence of orthogonal, one-dimensional transformations.

Limitations in this transform technique may be illustrated by a very simple transform, the "affine" transform. Affine transforms are limited in their ability to define complex warps. An affine transform is defined by the following matrix:

$$\begin{bmatrix} AD \\ BE \\ CF \end{bmatrix}$$

The matrix specifies the following transformations:

$X' = AX + BY + C$ $Y' = DX + EY + F$

X and Y represent locations on orthogonal axes. X' and Y' are the post transformation locations. A and E are scaling factors for X and Y respectively. B and D define shears. C and F are used to specify a constant offset.

Figure 5A:
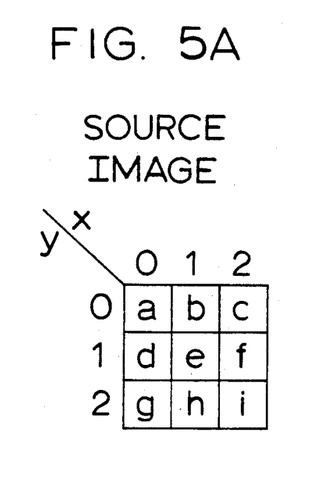
FIGS. 5A-5D are an example of a two-pass transform of a simple affine transform.
Figure 5B:
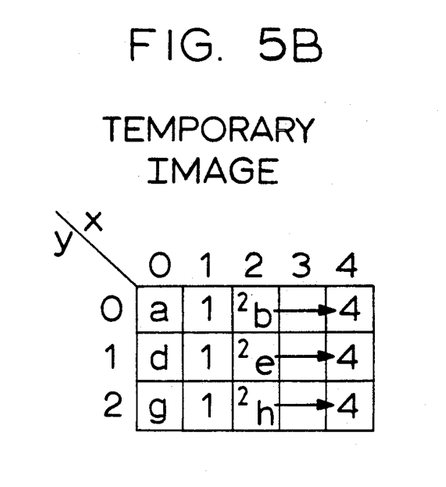
Figure 5C:
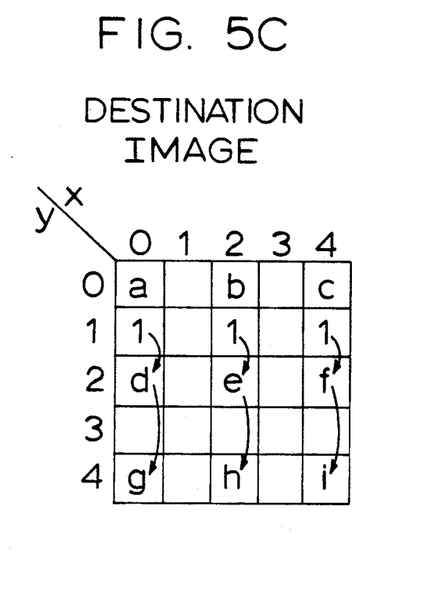
Figure 5D:
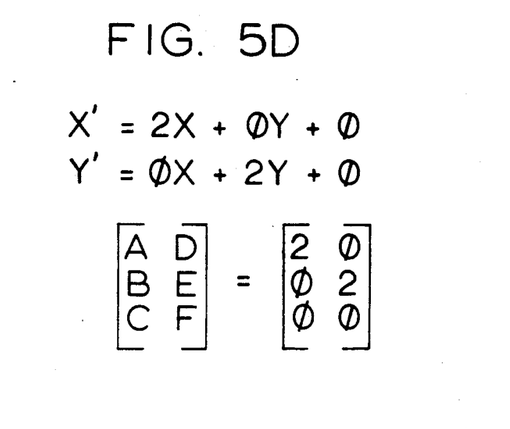

FIGS. 5A-5D are an example of a very simple transform. It is a doubling in X and Y. This can be seen in the fact that A=2 and E=2 (FIG. 5D). There is no cross-dependence, i.e., X' is independent of Y (B=0), and Y' is is independent of X (D=0).

For A greater than 1 the image is stretched in the X direction For Y greater than 1, the image is stretched in the Y direction. If A has a value between 0 and 1, the image shrinks in the X direction. If E has a value between 0 and 1, the image shrinks in the Y direction. By making the values negative, the image can be flipped.

In the first pass, the SOURCE IMAGE (FIG. 5A) is transformed to produce TEMPORARY (FIG. 5B). The displacements are readily observable. Calculation shows that the X coordinates in TEMPORARY are twice the magnitude of the X coordinates in the SOURCE IMAGE. The Y coordinates are as yet unchanged. However, after the second pass when TEMPORARY is transformed, then the doubling of both X and Y coordinates between SOURCE IMAGE and DESTINATION can be observed (FIG. 5C).

Affine transforms can be used for simple geometric transformations but do not provide a general solution to arbitrary mapping functions. Consider an affine transform in which there is a Y' dependency on the X term (i.e. D≠0), which is often the case. In that situation, without transforming Y during the X pass, the second pass (Y) equation will yield the wrong effect. During the first pass of a two pass transformation, new X values are generated. When the second pass is performed, the Y' equation requires the original X values. But, only X' values are then available.

A prior art solution to this problem is to invert the equation and rederive the original X values. This can easily be accomplished for affine equations. However, for higher order warps, the equations are often illconditioned, barring easy inversion. In addition, with certain warps, it is possible to have a "fold" in the warps so certain X values are not retrievable. Therefore, the two-pass transform technique utilizing inversion is inadequate for arbitrary warps.

Another method used to avoid the step of inverting the equation is to maintain the original X locations after the first pass and use them as a lookup table to provide the appropriate X value for each Y location in the second pass. However, this approach still suffers from a requirement that the equation must be evaluated in forward direction. That is, the warping function must be known while the warping operation is performed. This does not lend itself to a general warping solution and is not easily implemented in hardware.

The prior art methods for performing warping operations do not provide a general solution for arbitrary warps. Another disadvantage of prior art warping methods is the inability to provide solutions to warps having folds. Further, prior art warping methods can suffer from artifacts, blurring, bottlenecks and other problems.

Therefore, it is an object of the present invention to provide a method and apparatus for image transformation to implement nth order warps and further arbitrary warps.

It is another object of the present invention to provide a method and apparatus for image transformation which can implement a two-pass algorithm without inverting the transfer equations.

Another object of the present invention is to provide a method and apparatus for image transformation which may be used in connection with warps having folds.

It is yet another object of the present invention to provide a method and apparatus for image transformation which reduces bottlenecking, blurring and aliasing.

SUMMARY OF THE PRESENT INVENTION

The present invention provides a general solution for image transformation, such as warping, to realize arbitrary mapping functions. The invention also allows a warping function to be generated with a bicubic mesh defined by splines or some other suitable means. The bicubic mesh is utilized to create displacement tables for X and Y displacement, respectively. Alternatively, the tables can be generated directly from a desired warping function. The displacement tables represent the movement of each pixel from an original location in the source image to a new location in the destination image.

One of the displacement tables is applied to the source image to create an intermediate image and to the other displacement table to create a resampled displacement map. The resampled map is then applied to the intermediate image to create the destination image. By resampling, compensation for altered source image points is made. In this manner, no inversion of the underlying equations is required.

The present invention also avoids artifacts, blurring, bottlenecks and other problems caused by prior art warping methods. By considering the area of the intermediate image between the first pass and the second pass, the present invention is able to minimize blurring and aliasing associated with bottlenecking. Information loss is minimized so as to preserve image integrity. This intermediate area criteria is applied on a pixel by pixel basis to ensure that information loss is held at an absolute minimum.

DETAILED DESCRIPTION OF THE PRESENT INVENTION

A method and apparatus for image transformation is described. In the following description, numerous specific details such as number of splines, etc., are set forth to provide a more thorough description of the present invention. It will be apparent, however, to one skilled in the art, that the present invention may be practiced without these specific details. In other instances, well-known details have not been described in detail so as not to obscure the present invention.

The present invention provides a general solution to the transformation of images using arbitrary mapping functions. The general solution can be easily implemented in hardware.

The present invention utilizes "displacement tables" to implement a two pass algorithm which is a general solution for arbitrary warps.

The warping function, however defined, is used to identify pixel destination locations in two dimensional coordinates. Two displacement tables (also referred to as displacement maps), are generated. An X displacement table is generated which contains the relative displacement in the X direction for each pixel in the source image when acted on by the warping function. The Y displacement table contains the relative displacement in the Y direction for each source pixel when acted on by the warping function. The displacement tables are used to provide a numerical solution which avoids the problems of prior art warping solutions.

Figure 2:
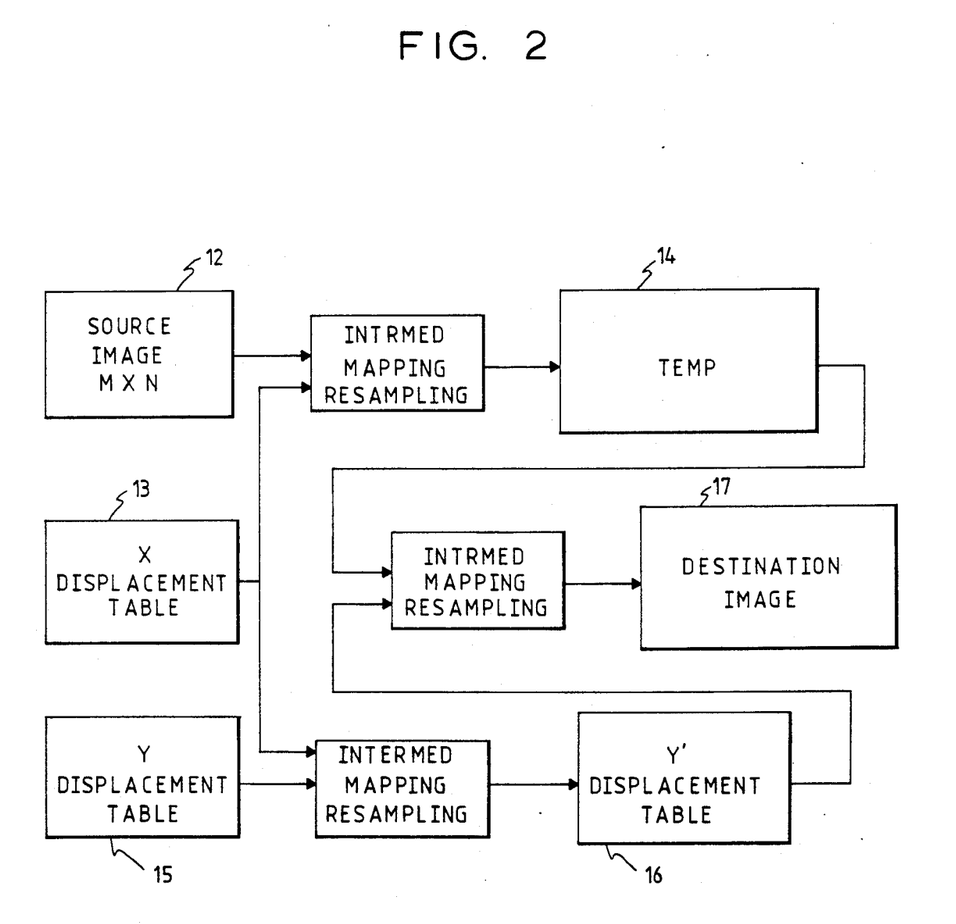
FIG. 2 is a flow diagram illustrating the operation of the present invention.

FIG. 2 is a block diagram of the method of the present invention. Source image 12 is transformed by the use of X displacement table 13. This transformation creates an intermediate image called TEMP 14, or temporary image. Simulatneously, Y displacement table 15 is similarly transformed by X displacement table 13. This creates a new version of Y displacement table, called Y' displacement table 16. Then, TEMP 14 is displaced by Y' displacement table 16. This second resampling of the image generates destination image 17.

Displacement tables 12, 14 and 15 contain the values of relative displacement of the pixels in the source image. The pixel in the "I" column and "J" row will be displaced in the X coordinate direction by the value contained in the I column and J row of the X displacement table array. Similarly, that same pixel will be displaced in the Y coordinate direction by the value in the I column and J row of the Y displacement table.

By applying the X displacement table to the Y displacement table to create an intermediate Y' displacement table, the present invention avoids the problem of mathematical inversion of complex or ill-conditioned functions.

A displacement table is applied to an image by the use of hardware resamplers. The resampler receives as input a single column or a single row of the source image and the appropriate displacement table. The resampler is able to transform the source image one row or one column at a time. The process can be instantaneous if a resampler is used for each row (or each column) of the source image. The resamplers can be used in order to transform a displacement table as well. Instead of inputting a row or a column of the source image that is to be transformed, a row or column of a displacement table can be input in its place. The transformation will then be effected on the displacement table.

Figure 3:
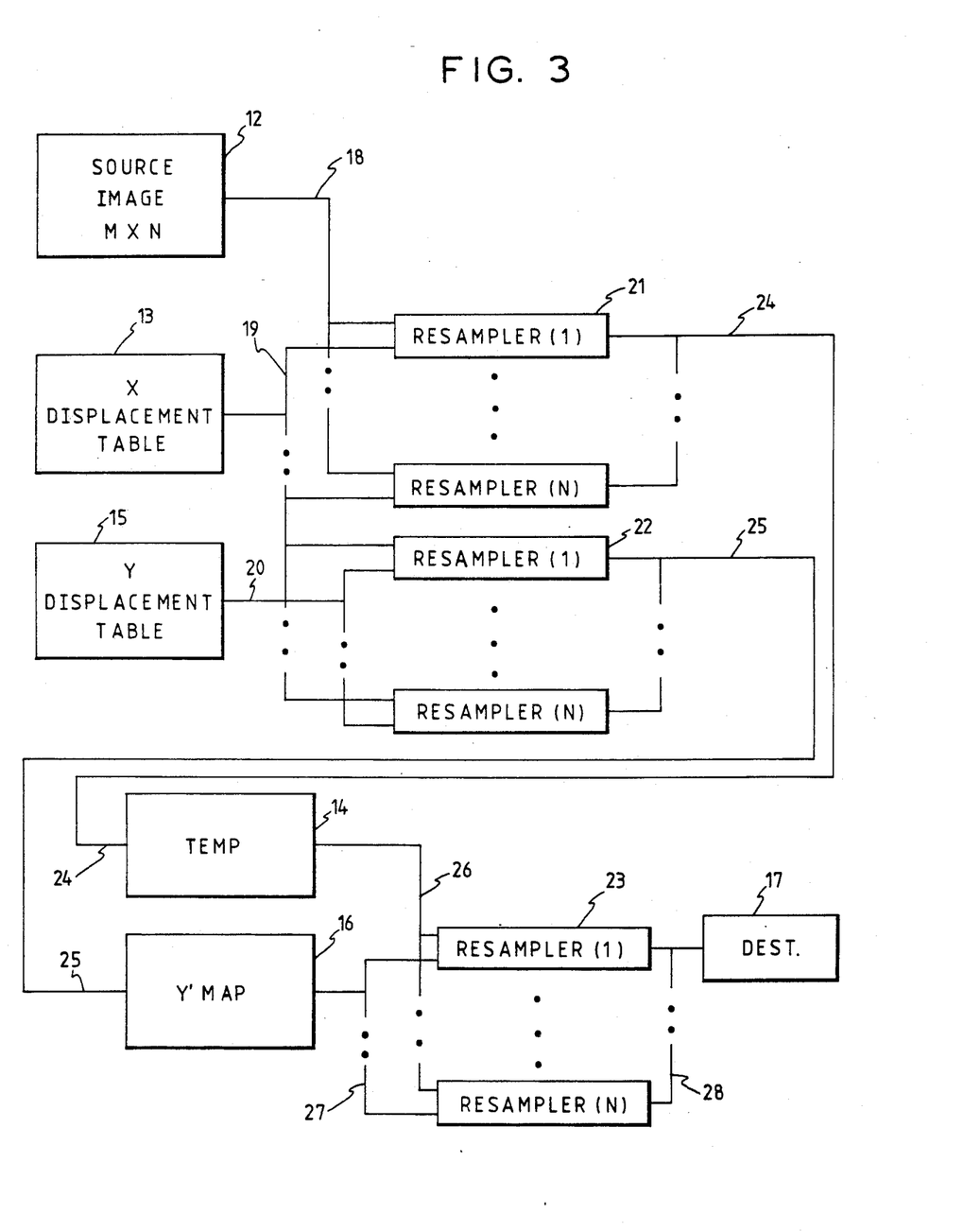
FIG. 3 is a block diagram of the preferred embodiment of the present invention.

The preferred embodiment of the present invention is illustrated in FIG. 3. Source image 12 is coupled on line 18 to the set of resamplers 21. X displacement table 13 is coupled on line 19 to sets 21 and 22 of resamplers. Y displacement table 15 is coupled on line 20 to set 22 of resamplers.

The output 24 of resamplers 21 is provided to TEMP image 14. Output 25 of resamplers 22 is provided to Y' map 16. Outputs 26 and 27 of TEMP 14 and Y' map 16 respectively, are provided to resamplers 23. Output 28 of resamplers 23 is provided to destination 17.

In operation, X displacement table 13 is combined with source image 12 at resamplers 21 and with Y displacement table 15 at resamplers 22. By combining X displacement table with Y displacement table 15 at the first pass, inversion of the underlying warping function is not required. Output 24 of resamplers 21 represents the combination of source image 12 and X displacement table 13, and is stored in TEMP 14. Output 25 of resamplers 22 represents the combination of X displacement table 13 and Y displacement table 15 and is stored in Y' map 16, representing an intermediate Y value. TEMP 14 and Y' map 16 are combined in resamplers 23 to provide the destination output of the warped transformation.

FIG. 3 illustrates the preferred hardware embodiment when the X pass is done first, with no transposition of the X or Y tables. However, with suitable use of row and column access a number of configurations of FIG. 3 running in parallel can be used to allow for the different orders of execution required to avoid aliasing and bottlenecking problems.

The source and destination images are composed of pixels. During processing, each pixel in the source image is treated in one of a number of ways, or a combination, to create the destination image. A pixel may be displaced, i.e., moved to the left, right, up or down. A pixel may be compressed. It may be combined with neighboring pixels in the source image and mapped to a single pixel in the destination image. A pixel in the source image may be enlarged; i.e. it may be mapped to a number of pixels in the destination image. Finally, the pixel may disappear during the processing. It may end up hidden behind a "fold" in the mapping, or it may be so compressed with so many neighboring pixels, that its contribution to the image of the destination is negligible.

The processing step between the source and destination images is a matter of converting the desired manipulation, the mapping of the image in terms of numerical displacements, proportional expansions and compressions.

When the requisite displacement tables are generated, then the source image is processed in a row-by-row manner using the X-coordinate displacement map and generates an intermediate image called "TEMP". Simultaneously, the Y displacement map is similarly processed to create what is then called Y' displacement map. After all the rows of the source image and the Y displacement map are thus processed, the intermediate image "TEMP" is then transformed by the Y' displacement map to produce the final "DEST" (destination) result image of the transformation.

The displacement mapping can be considered to be of two parts, X displacement and Y displacement maps. The displacement map can be divided into the X and Y composite parts. The X mapping includes an X displacement for every pixel in the source image. The Y mapping includes a Y displacement for those same pixels. By dividing the displacement mapping into X and Y coordinates, the image manipulator is able to utilize a two-pass technique which is a form of image transformation that is quick and accurate. The information in both X and Y displacement maps is high resolution. It is stored in the form of sub-pixel positioning numbers.

The displacement table method of the present invention allows rapid transformation because it avoids the time consuming recalculation of source X values. The source image is transformed by the X displacement map. By applying the X displacement table map to the source image and the Y coordinate displacement map, the inversion step of prior art methods is eliminated. The temporary image, which is the result of an X displacement map transformation of the source image, is then transformed with the Y displacement map which has also been transformed by the X displacement map (now called Y'). This method numerically adjusts the Y displacement map and makes a numerical approximation of the original X values unnecessary. It is much quicker than doing the calculations required to invert the original mapping. Furthermore, with some ill-conditioned displacement maps, the inversion is sometimes impossible. Therefore, the numerical approach embodied by this two-pass transformation technique solves problems which are otherwise insurmountable when doing inversion-based transformation.

The present technique also includes appropriate interpolation and accumulation functions. When a number of pixels are to be mapped onto a larger number of pixels of the destination image, interpolation takes place to cover the greater area. The interpolation function is able to cover the undefined pixels in the destination image by a smooth transition between defined pixels. Conversely, the accumulation function is able to map a number of pixels in the source image to a single pixel in the destination image. The accumulation function accumulates the values of the plurality of pixels to be mapped to the single destination pixel and sums the weighted contributions to create the value of the destination pixel.

WARP FUNCTION

In one embodiment of the present invention, a bicubic mesh is utilized to create the image warp. The bicubic mesh is generated by a matrix of knots, which defines a mesh of splines. A spline is defined by four or more points in space. The points, referred to as "knots," are weighted dependent on a basis function which controls the interpolation between knots. A four-by-four array of knots defines a two-dimensional spline and more knots can be used to define more complex splines.

Figure 1A:
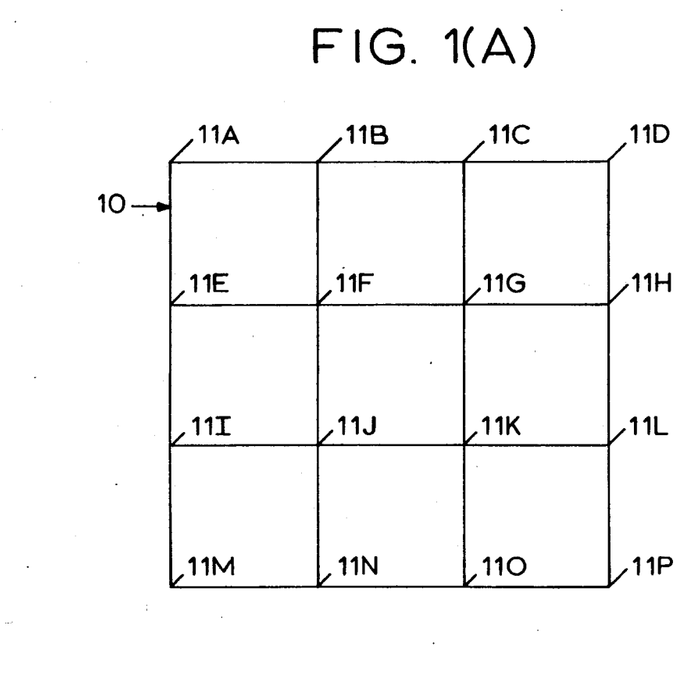
FIGS. 1A and 1B illustrate examples of bicubic meshes.

Referring to FIG. 1A, a bicubic mesh of unity is illustrated. The mesh 10 is comprised of a plurality of knots 11A–11P. In a computer graphics environment, the mesh of FIG. 1A is displayed over a source image. Because the image of FIG. 1A is a mesh of unity, no distortion of the underlying source image takes place.

Figure 1B:
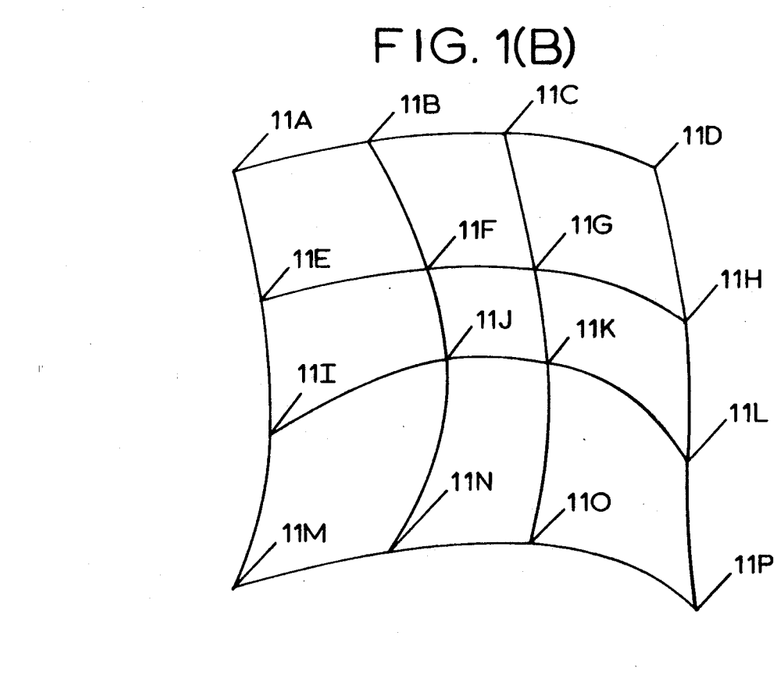

Using a cursor or other screen input device, a user can manipulate the knots, deforming the mesh as desired. For example, the mesh of FIG. 1B was created by moving knots 11F, 11J, 11K, and 11P of FIG. 1A. The deformed bicubic mesh is then used to create displacement maps for altering the source image to conform to the bicubic mesh.

The above method is very useful because of its ability to create a surface based on a limited number of surface changes. A user may move any number of knots in a manner which reflects his desire to distort the source image. A user may add more knots as required for greater control. A surface is then generated which makes the distortion continuous by interpolating between the desired distortion points. The interpolation function is independent of the warping function. In the preferred embodiment of the present invention, the spline is a Catmull-Rom spline as defined in Catmull and Rom, "A Class of Local Interpolating Splines," *Computer Aided Geometric Design*, R. E. Barnhill and R. F. Riesenfeld, ed. Academic, New York 1974.

Using this method, a user need not define a complex mathematical function to attempt to distort his image. The user need only move a number of knots on a mapping from which the computer can derive a spline surface and then calculate the necessary displacement, compression, expansion or erasure of the composite pixels of the source image. A user may utilize a mapping with many knots in order to precisely define image distortion. A user may also define a mapping with very few knots in order to introduce distortion to an image which is less geographically precise.

Once a mathematical function has been defined or knots have been moved and an approximating spline generated, then a displacement map is derived from the mathematical mapping, or model. The displacement map generated describes an X direction displacement and a Y direction displacement for each pixel in the source image. The displacement map contains displacement information to sub-pixel accuracy.

OPTIMIZATION

A problem that can occur in two-pass transformations is loss of data resolution. If the first pass compresses the image and the second pass enlarges it, pixel resolution is compromised. The present invention avoids this problem by making a pixel by pixel decision on how to preserve resolution by executing the enlarging step first, if possible. The present invention considers the area of the intermediate image between the first pass and the second pass.

The transformation can be done by applying the X displacement table first. Or, it may be achieved by performing the Y displacement table pass first. The source image and the mapping tables may be first transposed in order to reduce aliasing and blurring. And after the source image is transposed, then the X pass, or the Y pass can be executed first. In the present invention, the determination of whether an image should be X-passed first or Y-passed first, transposed or untransposed source image, can be done on a pixel by pixel basis. This ensures that every pixel is transformed in the most effective manner and the least amount of information is lost.

In combination, there are four different sequences in which the two-pass technique can be applied. Either the X or Y displacement table can be applied first and the source image and X and Y displacement tables can be applied in original or transposed form. Therefore, the four different approaches to applying the two-pass technique are: (1) X displacement table application first; (2) Y displacement table application first; (3) transpose source and displacement tables, X table application first; and (4) transpose source and displacement tables, Y table application first. The determination as to which of these four approaches best accomplishes the transformation depends on a criteria of intermediate surface area. The goal is to minimize information loss both due to compression in the first pass which must be expanded in the second pass and excessive shearing in the first pass.

The criteria for determining which of the four methods is most useful in transforming the image, that is, which of the four approaches minimizes artifacts, is based on the criteria of intermediate surface area, the intermediate surface area of the temporary image. The temporary image is the image which is obtained after the source image has been transformed by a first pass (which can be from either the X displacement map or the Y displacement map, or transposed versions thereof).

In operation, the displacement maps are analyzed to determine the intermediate area which would be generated for each of the four transformation orders.

Of the four temporary images which could be generated, the one with the greatest surface area represents the first pass which optimizes information retention. That is, if applying the X displacement map to the source image creates an intermediate image of surface area $S_1$, applying the Y displacement map to the source image creates an intermediate image of surface area $S_2$, applying the transposed X displacement map to the transposed source image creates an intermediate image of surface area $S_1$, applying the Y displacement map to the source image creates an intermediate image of surface area $S_2$, applying the transposed X displacement map to the transposed source image creates an intermediate image of surface area $S_3$, applying the transposed Y displacement map to the transposed source image creates intermediate image with surface area $S_4$. Information loss is minimized by considering the relative values of $S_1$, $S_2$, $S_3$ and $S_4$. If $S_2$ is greater than $S_1$, $S_3$ and $S_4$, then the algorithm of the present invention applies the untransposed Y displacement map to the untransposed source image in order to optimize information retention. If $S_3$ is greater than $S_1$, $S_2$ and $S_4$, then the source image and displacement maps should first be transposed, and then the transposed X displacement map applied first to the transposed source image. If $S_1$ is the greatest of the four surface areas, then the untransposed X displacement map should be first applied to the untransposed source image. If $S_4$ is the greatest, then the source image and displacement maps should be first transposed, and then the Y displacement map applied to the source image.

So far, this consideration as to X or Y displacement table application first or transposed or untransposed tables and images has limited itself to a criteria based on the entire image. Optimization can be at a pixel level as well. That is, each pixel can be evaluated by the surface area to which that pixel maps in the destination image. By this technique, each pixel is determined to be optimally transformable in one of the four above methods. Each pixel is evaluated as described in the previous paragraph and its optimum method for transformation is noted and stored. Ultimately, when the transformation is executed, the algorithm utilizes the information for each pixel and transforms that particular pixel in the optimum of the four possible application approaches. The calculations for A, B, C and D are performed for each pixel. Then the determination of order of execution can be made to eliminate artifacts.

Figure 4:
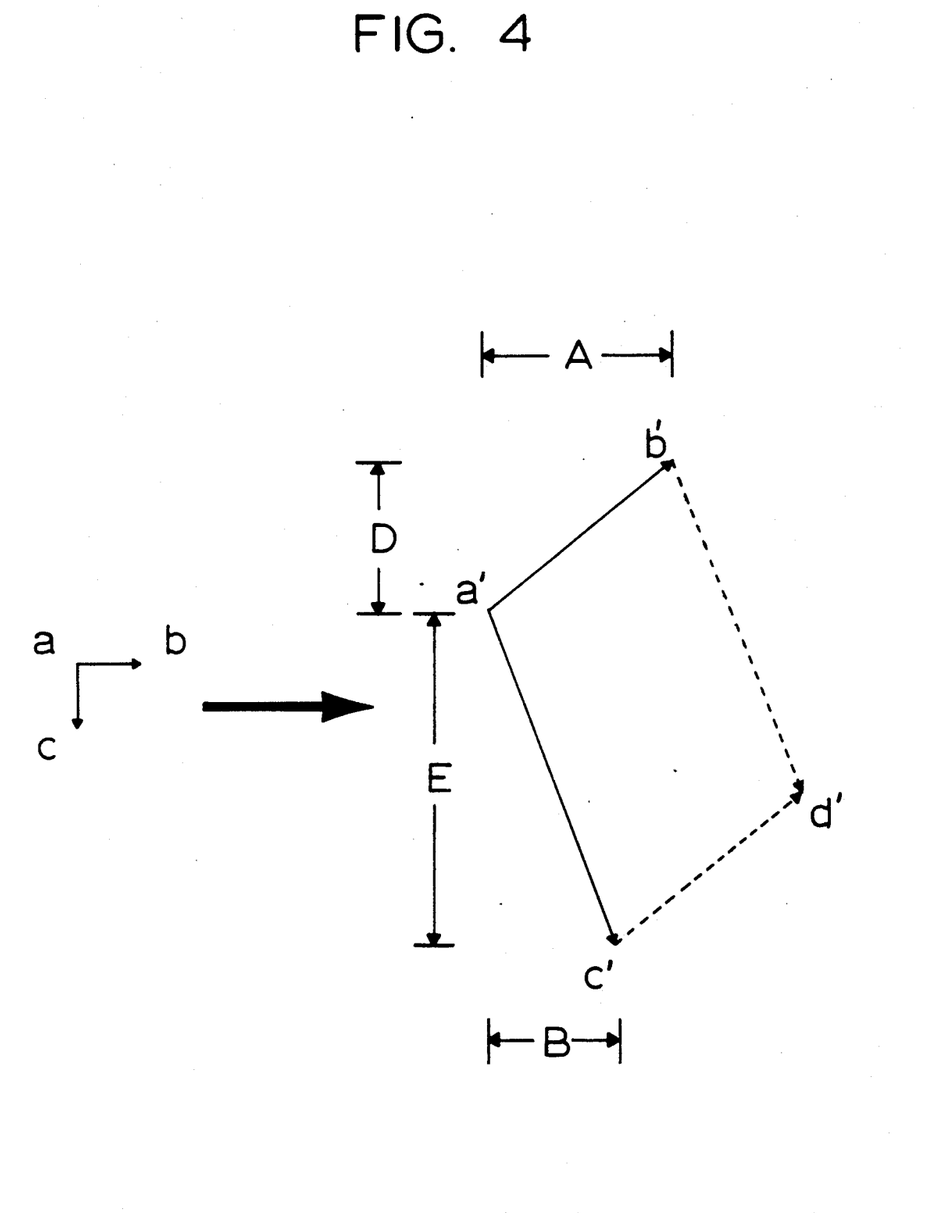
FIG. 4 is a vector diagram illustrating a local affine transformation.

The present invention assumes that the transformation is locally affine at a pixel. Thus, only three pixels need to be considered, the current pixel and its immediate right and lower neighbors. FIG. 4 illustrates this situation. Notice that d' is implicit, since we are assuming a local affine approximation. Since we have a map for each pixel, a, b, and c are on the unit lattice. Examination of the affine equation tells us that:

$$A = a'b'_x$$
$$B = a'c'_x$$
$$C = a'b'_y$$
$$D = a'c'_y.$$

Our map stores $\Delta X$ and $\Delta Y$, which gives us the following:

$$a'_x = a_x + \Delta a_x$$
$$b'_x = b_x + \Delta b_x$$
$$c'_x = c_x + \Delta c_x$$
$$a'_y = a_y + \Delta a_y$$
$$b'_y = b_y + \Delta b_y$$
$$c'_y = c_y + \Delta c_y.$$

Knowing that a, b and c are on the unit lattice gives us:

$$b_x = a_x + 1$$
$$b_y = a_y$$
$$c_x = a_x$$
$$c_y = a_y + 1$$

Thus, we have:

$$A = \Delta b_x - \Delta a_x + 1$$
$$B = \Delta c_x - \Delta a_x$$
$$D = \Delta b_y - \Delta a_y$$
$$E = \Delta c_y - \Delta a_y + 1$$

Information is gathered on a pixel by pixel basis. For each pixel, the present invention determines whether the transformation should occur X first, Y first and in transposed or untransposed form as follows. First the absolute values of A, B, D and E are determined. If either of A or B is greater than both of D or E, perform the X pass first, otherwise, perform the Y pass first. If the X pass is first, and A is less than B, then also perform a transposition. If Y pass is first, and E is less than D, then also perform a transposition. Information is stored in four images. Each image is composed of 1's and 0's. For any given pixel, if that pixel is to be transformed X pass first, then the corresponding position in the X pass first (XPF) image is a 1, and the Y pass first, (YPF) image, is a 0. Also, the corresponding positions in the X transpose (XTF) image and Y transpose (YTF) image are also 0. Similarly, if a pixel in the source image is to be transformed in the transposed form with the Y pass first, then the corresponding positions in the X pass first, Y pass first and X transpose first will all be 0. Only the corresponding pixel in the Y transpose first image will be 1.

The destination image, denoted $I_{out}$, is given by a linear combination of four images:

$$I_{out} = I_X I_{XFC} + I_{XT} I_{TXFC} + I_Y I_{YFC} + I_{YT} I_{TYFC}$$

$I_X$ is the source image transformed X pass first. $I_Y$ is the source image transformed Y pass first. $I_{XT}$ is the source image transformed X first in transposed form. $I_{YT}$ is the source image transformed Y first in transposed form. The equation above can be read. $I_{out}$, the destination image, is the sum of: the source image transformed X pass first multiplied by the X first control image (XPF) also transformed X pass first; the source image transformed X pass first in the transposed form multiplied by the X transposed first (XPF) control image also transformed with the X pass first in the transposed form; the source image transformed Y pass first multiplied by the Y pass control image (XPF) also processed Y pass first; and the source image transformed Y pass first in the transposed form multiplied by the Y transposed control image (YTF) also transformed in the Y pass first transposed form. $I_{out}$, the destination image is the sum of these four products. By utilizing this number of additional warps and images, the maximum amount of information is retained. This minimizes undesirable effects such as blurring, aliasing and the production of artifacts. If desired, only two control images, X pass first and transpose, need be generated and $I_{OUT}$ is generated as follows:

$$I_{out} = I_X I_{XC}(1 - I_{TC}) + I_{XT} I_{XC} I_{TC} + I_Y (1 - I_{XC})(1 - I_{TC}) + I_{YT}(1 - I_{XC}) I_{TC}$$

DISPLACEMENT MASKS

The present invention also provides a displacement mask for use in warping operations. With a displacement mask an image manipulator may specify how much of the warping is to be applied at each pixel. It may reduce or eliminate warping over a greater portion of the image, ensuring that only a very small portion of it is actually warped. For example, to transform the image of a face, the user can specify that only the mouth region is to be transformed. The rest of the source image remains unchanged, even if the warp specified is global. A displacement mask may be thought of as a scaling of a displacement map. It transitions between regions where the specified warping is to be applied completely to those regions where little or none of the effect of the warp is executed.

SHADING

Because the method of the present invention utilizes relative displacements, a gradient field exists for the image. If a z field is present, a surface normal A can be directly computed. Even if only x and y information is present, a surface normal can still be generated. M reflects the fact that the gradient field is normalized. $M = \| du, dv, da \|$ depends on the way in which the field is normalized.

$$|du+dv| < M$$

Thus, dz should be defined such that:

$$du^2 + dv^2 + dz^2 = M^2$$

Since, $$A = \frac{\nabla G}{\|\nabla G\|}$$

and $\|\nabla G\| = M$ as defined
and the computation of dz completely specifies $\nabla G$, then we can compute A as:

$$A = \frac{(du, dv, \sqrt{M^2 - du^2 - dv^2})}{M}$$

Given this unit normal vector to the surface at a pixel, a shading function can be invoked at each pixel. The shading method is described in U.S. Pat. No. 4,835,712 entitled "METHOD AND APPARATUS FOR IMAGING VOLUME DATA WITH SHADING" and assigned to the assignee of the present invention, and incorporated herein by reference. Other shading functions can also be easily implemented such as surface material properties.

FOLDS

A bicubic warp may have "folds" in it, where the surface can be thought to fold back on itself. If a Z map is present, then it can be determined which parts of the surface are visible. Without a Z buffer, some arbitrary assumptions can be made which allow the present invention to produce coherent output. The present invention utilizes a moving horizon algorithm. The displacement table is scanned from the left to right and a horizon maintained. Pixels are only "visible" if they move the horizon. Otherwise, they are lost behind the horizon. This approach assumes that an obscured area stays obscured. This provides a reasonable solution to the fold problem without requiring large amounts of memory.

Thus, a general solution to implement arbitrary warping functions has been described.

I claim:

1. A method for performing a non-affine image transformation on a source image comprised of a plurality of points having at least X and Y values comprising the steps of:
   defining a warp mesh representing said non-affine transformation of said source image;
   defining an X displacement table, the entries of said X displacement table representing the displacement of each point of said source image in an X direction resulting from said non-affine transformation;
   defining a Y displacement table, the entries of said Y displacement table representing the displacement of each point of said source image in a Y direction resulting from said non-affine transformation;
   resampling said source image with said X displacement table to generate an intermediate image;
   resampling said Y displacement table with said X displacement table to generate an intermediate Y displacement table;
   resampling said intermediate image with said intermediate Y displacement table to generate a destination image representing said non-affine transformation of said source image.

2. The method of claim 1 wherein said entries of said X and Y displacement tables are described to sub-pixel accuracy.

3. A circuit for performing a non-affine image transformation on a source image comprised of a plurality of points having at least X and Y values comprising:
   first storage means for storing said source image;
   second storage means for storing an X displacement table, the entries of said X displacement table representing the displacement of each point of said source image in an X direction resulting from said non-affine transformation;
   third storage means for storing a Y displacement table, the entries of said Y displacement table representing the displacement of each point of said source image in a Y direction resulting from said non-affine transformation;
   first resampling means coupled to said first and second storage means for resampling said source image with said X displacement table to generate an intermediate image, said intermediate image stored in a fourth storage means;
   second resampling means coupled to said second and third storage means for resampling said Y displacement table with said X displacement table to generate an intermediate Y displacement table, said intermediate Y displacement table stored in a fifth storage means;
   third resampling means coupled to said fourth and fifth storage means for resampling said intermediate image with said intermediate Y displacement table to generate a destination image representing said non-affine transformation of said source image, said destination image stored in a sixth storage means.

4. A method for performing a non-affine image transformation on a source image comprised of a plurality of points having at least X and Y values comprising the steps of:
   defining a warp mesh representing said non-affine transformation of said source image;
   defining an X displacement table, the entries of said X displacement table representing the displacement of each point of said source image in an X direction resulting from said non-affine transformation;
   defining a Y displacement table, the entries of said Y displacement table representing the displacement of each point of said source image in a Y direction resulting from said non-affine transformation;
   resampling said source image with said X displacement table to generate a first intermediate image of surface area S1;
   resampling said source image with said Y displacement table to generate a second intermediate image of surface area S2;
   transposing said source image and said X and Y displacement tables, and resampling said transposed source image with said transposed X displacement table to generate a third intermediate image of surface area S3;
   resampling said transposed source image with said transposed Y displacement table to generate a fourth intermediate image of surface area S4;
   when S1 is greater than S2, S3 and S4, resampling said Y displacement table with said X displacement table to generate an intermediate Y displacement table, then resampling said first intermediate image with said intermediate Y displacement table to generate a destination image representing said non-affine transformation of said source image;

when S2 is greater than S1, S3 and S4, resampling said X displacement table with said Y displacement table to generate an intermediate X displacement table, then resampling said second intermediate image with said intermediate X displacement table to generate a destination image representing said non-affine transformation of said source image;

when S3 is greater than S1, S2 and S4, resampling said transposed Y displacement table with said transposed X displacement table to generate a transposed intermediate Y displacement table, then resampling said third intermediate image with said transposed intermediate Y displacement table to generate a destination image representing said non-affine transformation of said source image;

when S4 is greater than S1, S2 and S3, resampling said transposed X displacement table with said transposed Y displacement table to generate a transposed intermediate X displacement table, then resampling said fourth intermediate image with said transposed intermediate X displacement table to generate a destination image representing said non-affine transformation of said source image.

5. The method of claim 4 wherein said entries of said X and Y displacement tables are described to sub-pixel accuracy.

* * * * *